United States Patent [19]

Minnick

[11] Patent Number: 4,894,404

[45] Date of Patent: Jan. 16, 1990

[54] MOLDING COMPOSITIONS BASED ON POLY(1,4-CYCLOHEXYLENE DIMETHYLENE TEREPHTHALATE) CONTAINING AN AMIDE CRYSTALLIZATION AID

[75] Inventor: Larry A. Minnick, Bluff City, Tenn.

[73] Assignee: Eastman Kodak Company, Rochester, N.Y.

[21] Appl. No.: 245,599

[22] Filed: Sep. 19, 1988

[51] Int. Cl.$^4$ ............................................... C08K 5/20
[52] U.S. Cl. ................................... 524/226; 524/227; 524/605
[58] Field of Search ............... 524/227, 226, 605, 494; 528/307

[56] References Cited

U.S. PATENT DOCUMENTS

| | | | |
|---|---|---|---|
| 3,592,875 | 7/1971 | Brinkmann et al. | 528/307 |
| 3,660,557 | 5/1972 | Smith et al. | 524/227 |
| 3,761,450 | 9/1973 | Herwig et al. | 528/307 |
| 4,223,113 | 9/1980 | Bier et al. | 525/439 |
| 4,223,125 | 9/1980 | Bier et al. | 528/305 |
| 4,351,757 | 9/1982 | Hoeschele | 524/169 |
| 4,352,904 | 10/1982 | Deyrup | 524/292 |
| 4,645,792 | 2/1987 | Chatterjee | 524/226 |

*Primary Examiner*—Lewis T. Jacobs
*Attorney, Agent, or Firm*—John F. Stevens; William P. Heath, Jr.

[57] ABSTRACT

Disclosed is a polyester molding composition comprising poly (1,4-cyclohexylene dimethylene terephthalate), glass fibers and an amide compound as a crystallization aid.

6 Claims, No Drawings

MOLDING COMPOSITIONS BASED ON POLY(1,4-CYCLOHEXYLENE DIMETHYLENE TEREPHTHALATE) CONTAINING AN AMIDE CRYSTALLIZATION AID

FIELD OF THE INVENTION

The invention relates to poly(1,4-cyclohexylene dimethylene terephthalate) (PCT) compositions having improved crystallization characteristics due to the presence of amide compounds as defined herein. Specifically, the invention is directed to glass fiber reinforced PCT compositions containing these amide crystallization aids which have high strength, stiffness, and heat resistance properties.

BACKGROUND OF THE INVENTION

Poly(alkylene terephthalate) resins are used for manufacturing fibers, films, and molded articles and have excellent physical properties such as high wear resistance, durability, and heat resistance.

An important class of poly(alkylene terephthalate) resins are the PCT resins based on reactions between 1,4-cyclohexanedimethanol and terephthalic acid or suitable synthetic equivalents. Glass fiber reinforced PCT compositions having high crystallinity have excellent properties with regard to strength, stiffness, and heat resistance. These PCT compositions are useful in applications where high strength, stiffness, and heat resistance are necessary, for example, molded parts for use in the automotive and electronic industries.

High crystallinity is essential to ensure adequate hardness, strength, and heat resistance at elevated temperatures. To ensure adequate crystallinity, PCT compositions generally require mold temperatures of 150° C. or higher. High mold temperatures are possible only with sophisticated molding equipment and require specialized heating means, such as, for example, oil bath heating units. Such units are expensive to purchase and to operate.

Crystallization aids have been suggested as a method of promoting crystallization in poly(alkylene terephthalate) at lower temperatures to lower the required mold temperature. The use of ester compounds as crystallization aids is described, for example, in U.S. Pat. Nos. 4,223,125 and 4,223,113. Certain amides are mentioned as a component in crystallization systems for poly(ethylene terephthalate) in U.S. Pat. Nos. 4,351,757 and 4,352,904. Other types of crystallization aids include ketones and sulfonamides. However, these additives can be volatile at high temperatures giving rise to volatility losses of the additives during drying which result in difficulties in drying the PCT compositions after compounding.

Accordingly, a need remains for glass fiber reinforced PCT compositions which can be molded at low temperatures and yet retain adequate physical properties.

DESCRIPTION OF THE INVENTION

According to the present invention there is provided a reinforced polyester molding composition having an improved crystallization rate comprising
(a) poly(1,4-cyclohexylene dimethylene terephthalate) having an inherent viscosity of about 0.5 to 1.0,
(b) about 10% to 55%, based on the total composition weight, of glass fibers having a length of about ⅛ to ¼ inch, and
(c) about 2 to 15%, based on the total composition weight, of the reaction product of
  (1) an aliphatic diamine of the formula:

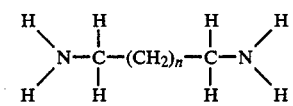

wherein n is an integer of from 0 to 10, and
  (2) a monocarboxylic acid selected from aliphatic organic acids having a carbon chain length of 8 to 36, benzoic acid, and benzoic acid substituted with an alkyl group of 1 to 12 carbon atoms.

Such reinforced PCT compositions have high crystallinity, improved drying characteristics, and can be molded at temperatures below about 150° C. while retaining excellent physical properties.

The PCT used in the present invention may be a polyester based substantially on 1,4-cyclohexane-dimethanol and terephthalic acid monomer units or may be copolymers having up to about 10 mol % of copolymerizable acid and/or diol monomers. If comonomers are used, preferred comonomers include isophthalic acid, naphthalenedicarboxylic acid, cyclohexanedicarboxylic acid, succinic acid, sebacic acid, adipic acid, ethylene glycol, diethylene glycol, butanediol, hexanediol, and neopentyl glycol, for example.

The PCT of the present invention preferably has an inherent viscosity which is greater than about 0.5. When the inherent viscosity of the PCT resin is lower than 0.5, the glass reinforced PCT resin composition exhibits poor physical properties. The upper limit of the inherent viscosity of the PCT is dependent only on the processibility of the PCT. With very high inherent viscosities, the processibility of the polyester decreases due to difficulties in extrusion, compounding, etc., although the inherent viscosity decreases somewhat as a result of processing. A preferred inherent viscosity range is from about 0.5 to 1.0 although higher viscosity ranges are considered to be within the scope of the present invention. A particularly preferred inherent viscosity is approximately 0.77.

PCT comprising substantially only 1,4-cyclohexanedimethanol and terephthalic acid monomer units are preferred for use in the present invention since such resins exhibit the best crystallization properties when molded at low temperatures. These resins are commercially available or may be prepared using conventional, well known techniques.

The glass fiber reinforced PCT compositions of the present invention contain from about 10% to about 55%, based on total composition weight, of reinforcing glass fibers. Glass fibers suitable for use in the present invention may be in the form of glass filaments, threads, fibers, or whiskers, etc., and may vary in length from about ⅛ inch to about 2 inches. Chopped glass strands having a length of ⅛ inch to about ¼ inch are preferred. Such glass fibers are well known in the art. For purposes such as the reduction of warpage of molded parts, the PCT resin may be reinforced with a mixture of glass fibers and a plate-like filler such as mica.

The amide compounds used in the compositions of the present invention are the reaction product of (1) an aliphatic diamine of this formula:

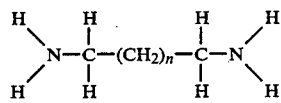

wherein n is an integer of from 0 to 10, and
(2) a monocarboxylic acid selected from aliphatic organic acids having a carbon chain length of 8 to 36, benzoic acid, and benzoic acid substituted with an alkyl group of 1 to 12 carbon atoms.

Preferred aliphatic diamines include those having 2 to 6 carbon atoms, and most preferred are those of 2 to 4 carbon atoms. The term "monocarboxylic acid" is intended to include functional derivatives thereof such as monocarboxylic acid halides.

Preferred aliphatic monocarboxylic acids are those having 12 to 22 carbon atoms, for example, stearic, palmitic, myristic, lauric, etc. Of the aromatic acids, benzoic is preferred.

The amides described above may be prepared using conventional techniques well known to those skilled in the art and general description of process. Some are commercially available, for example, N,N'-ethylene bis (stearamide). Although the amides may be used in concentrations of about 2% to 15% based on the weight of the composition, about 3% to 10% is preferred.

Additionally, the compositions of the present invention may contain additives such as stabilizers, colorants, lubricants, flame retardants, and additives to enhance the processibility of the resin. Such additives are generally present in amounts varying from about 0.1 to about 20 weight % based on the total weight of the glass fiber reinforced PCT composition.

The glass fiber reinforced PCT compositions of the present invention may be molded at mold temperatures below 150° C., and are therefore easily molded without the need for expensive mold heating equipment. The preferred mold temperature of the present compositions is from about 95° C. to about 120° C., since such temperatures can be attained using molding equipment heated by steam or pressurized steam. Even at molding temperatures as low as 95° C., the PCT compositions of the present invention exhibit acceptable crystallinity and smoothness, as well as excellent strength, stiffness, and heat resistant properties.

The following examples are submitted for a better understanding of the invention.

EXAMPLE 1

This example illustrates the preparation of an amide useful in the present invention. Thirty grams (0.5 m) of ethylenediamine are mixed with 200 ml of pyridine in a flask with stirring. The mixture is chilled and 140.6 grams (1.0 m) of benzoyl chloride are added dropwise between 5° C. and 15° C. Some additional pyridine (about 125 ml) is added to facilitate stirring. After the addition of benzoyl chloride is complete, the mixture is gradually heated with stirring and held between 70° and 80° C. for about 1 hour. The mixture is then drowned into cold water. The solid which precipitates is collected by filtration and washed with water. The product is then reslurried with ice and water containing a small amount of concentrated HCl to remove traces of pyridine. Again the solid is collected by filtration, washed with water and air-dried. It is light, yellow-orange in color. The material is recrystallized and allowed to cool. It is again filtered and washed. It is air-dried on the filter, then further dried in a vacuum oven at 100° C. overnight. The yield in 114 grams.

EXAMPLE 2

Blends of PCT containing 5 and 10 weight % N,N'-ethylene bis (stearamide) are prepared by melt compounding on the Brabender extruder and thermal transitions are determined on the resulting extrudate by differential scanning calorimetry (DSC). Blends of PCT containing 2.5, 5, and 10 weight % N,N'-ethylene bis (benzamide) are prepared by the same procedure and thermal transitions are determined on the resulting extrudate by differential scanning calorimetry (DSC). The glass transitions and crystallization temperatures on heating are lowered as the amide compounds are added to the PCT (see Table 1). This is an indication of improved crystallization characteristics in the PCT at lowered temperatures.

EXAMPLE 3

A blend of PCT containing 30 weight % Owen-Corning 492AA glass fiber and 5 weight % N,N'-ethylene bis (stearamide) are prepared by melt compounding on the 2-inch Sterling single screw extruder and chopping the resulting extrudate into ⅛-inch pellets. The blend is injection molded into tensile and flexural bars on the Arburg molding machine using mold cavity temperatures of 92° and 114° C. The resulting molded bars have high crystallinity using both mold cavity temperatures as evidenced by their high strength and heat deflection properties (see Table 2). These bars released well from the mold and had high surface gloss. Glass reinforced PCT without the amide compounds need mold cavity temperatures of 140° to 150° C. to produce bars with adequate crystallinity and surface gloss.

TABLE 1

Effect of Selected Amides on the Thermal Transitions of PCT

| | | | | | | |
|---|---|---|---|---|---|---|
| N,N'—ethylene bis (stearamide), wt % | — | 5 | 10 | — | — | — |
| N,N'—ethylene bis (benzamide), wt % | — | — | — | 2.5 | 5 | 10 |
| Thermal Transitions* | | | | | | |
| Tg, C. | 95 | 89 | 84 | 81 | 77 | — |
| Tch, C. | 140 | 116 | 113 | 129 | 119 | 106 |
| Tm, C. | 292 | 291 | 292 | 290 | 292 | 289 |
| Tcc, C. | 230 | 242 | 244 | 234 | 232 | 229 |
| Inherent Viscosity, dl/g | 0.77 | 0.59 | 0.59 | 0.60 | 0.60 | 0.57 |

*Measured by DSC using conventional methods.
Tg is glass transition temperature.
Tch is crystallization temperature upon heating.
Tm is melting temperature.
Tcc is crystallization temperature upon cooling.

TABLE 2

Mechanical Properties of PCT/30 Wt % Glass Fiber/5 Wt % N,N'—Ethylene Bis (Stearamide)

| | | | | ASTM Method |
|---|---|---|---|---|
| Mold Cavity Temp., C. | | 92 | 114 | |
| Tensile Strength, psi | | 17,430 | 17,350 | D638 |
| Tensile Elongation, % | | 4 | 4 | D638 |
| Flexural Strength, psi | | 25,900 | 25,400 | D790 |
| Flexural Modulus, psi | | 1,170,000 | 1,210,000 | D790 |
| Notched Izod Impact, ft-lb/in | 23 C. | 2.0 | 2.0 | D256 |
| | −40 C. | 1.8 | 1.8 | D256 |
| Unnotched Izod Impact, ft-lb/in | 23 C. | 15.0 | 17.3 | D256 |
| | −40 C. | 14.7 | 15.6 | D256 |
| Heat Deflection Temp. | C. | 255 | 260 | D648 |

TABLE 2-continued

Mechanical Properties of PCT/30 Wt % Glass Fiber/5 Wt % N,N'—Ethylene Bis (Stearamide)

|  |  | ASTM Method |  |
| --- | --- | --- | --- |
| @264 psi |  |  |  |
| DSC, C. | Tg | — | 73 |
|  | Tch | — | 120 |
|  | Tm | — | 290 |
|  | Tcc | — | 242 |
| Inherent Viscosity, dl/g |  | 0.51 | 0.52 |

As used herein, the inherent viscosity (I.V.) is measured at 25° C. using 0.50 g of polymer per 100 mL of a solvent consisting of 60% by weight phenol and 40% by weight tetrachloroethane.

Unless otherwise indicated, all parts, percentages, ratios, etc., are by weight.

Obviously, numerous modifications and variations of the present invention are possible in light of the above teachings. It is, therefore, to be understood that within the scope of the appended claims, the invention may be practiced otherwise than as specifically described herein.

I claim:

1. A reinforced polyester molding composition having an improved crystallization rate comprising
   (a) poly (1,4-cyclohexylene dimethylene terephthalate) having an inherent viscosity of about 0.5 to 1.0,
   (b) about 10% to 55%, based on the total composition weight, of glass fibers having a length of about ½ to 2 inches, and
   (c) about 2% to 15%, based on the total composition weight, of the reaction product of
      (1) an aliphatic diamine of the formula

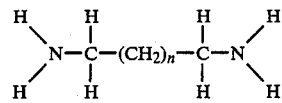

wherein n is an integer of from 0 to 10, and
      (2) a monocarboxylic acid selected from aliphatic organic acids having a carbon chain length of 8 to 36, benzoic acid, and benzoic acid substituted with an alkyl group of 1 to 12 carbon atoms.

2. Composition according to claim 1 wherein said poly (1,4-cyclohexylene dimethylene terephthalate) has an I.V. of about 0.7 to 0.8.

3. Composition according to claim 1 wherein said glass fibers have a length of about ⅛ to ¼ inch.

4. Composition according to claim 1 wherein said glass fibers are present in an amount of about 15% to 40% by weight of the total composition.

5. Composition according to claim 1 wherein said reaction product is N,N'-ethylene bis (stearamide) or N,N'-ethylene bis (benzamide).

6. A molded product comprising the composition of claim 1.

* * * * *

UNITED STATES PATENT AND TRADEMARK OFFICE
CERTIFICATE OF CORRECTION

PATENT NO. : 4,894,404

DATED : January 16, 1990

INVENTOR(S) : Larry A. Minnick

It is certified that error appears in the above-identified patent and that said Letters Patent is hereby corrected as shown below:

Column 6, line 2, Claim 1(b) "1/2" should read --- 1/8 ---

Signed and Sealed this

Eighth Day of January, 1991

Attest:

HARRY F. MANBECK, JR.

*Attesting Officer*     *Commissioner of Patents and Trademarks*